US008931149B2

(12) United States Patent
Ichikawa et al.

(10) Patent No.: US 8,931,149 B2
(45) Date of Patent: Jan. 13, 2015

(54) WIRE COLORING APPARATUS INCLUDNG A ROLLER

(75) Inventors: Hiroaki Ichikawa, Makinohara (JP); Masahiko Agata, Makinohara (JP); Tatsuo Osada, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/396,144

(22) Filed: Feb. 14, 2012

(65) Prior Publication Data

US 2012/0145072 A1 Jun. 14, 2012

Related U.S. Application Data

(63) Continuation of application No. 12/086,278, filed as application No. PCT/JP2006/324627 on Dec. 5, 2006, now abandoned.

(30) Foreign Application Priority Data

Dec. 9, 2005 (JP) ................................ 2005-355692

(51) Int. Cl.
*G06F 19/00* (2011.01)
*B41F 17/00* (2006.01)
*H01B 13/34* (2006.01)

(52) U.S. Cl.
CPC .................................... *H01B 13/345* (2013.01)
USPC ............ 29/33 F; 29/33 Q; 118/420; 118/307; 140/147; 72/31.03

(58) Field of Classification Search
USPC ....... 29/564, 33 Q, 33 S, 33 F; 118/420, 307, 118/324; 140/147; 72/250, 251, 31.03, 160
See application file for complete search history.

(56) References Cited

U.S. PATENT DOCUMENTS

| | | | |
|---|---|---|---|
| 2,428,284 | A | 9/1947 | Krogel |
| 2,756,718 | A | 7/1956 | Stone, Jr. et al. |

(Continued)

FOREIGN PATENT DOCUMENTS

| | | | |
|---|---|---|---|
| EP | 1548757 | A1 | 6/2005 |
| JP | 63-178048 | A | 7/1988 |

(Continued)

OTHER PUBLICATIONS

International Search Report mailed Mar. 16, 2007, issued on PCT/2006/324627.

(Continued)

*Primary Examiner* — David Bryant
*Assistant Examiner* — Jason L Vaughan
(74) *Attorney, Agent, or Firm* — Edwards Wildman Palmer LLP

(57) ABSTRACT

A wire coloring apparatus including a roller is provided to prevent drag of a colorant, which is jetted on an electric wire and not dried yet, the guide roller is arranged at a downstream side of a coloring nozzle, which jets a colorant toward a highest point of an outer surface of the electric wire moving along a lengthwise direction thereof, in a moving direction of the electric wire. The guide roller is formed with a pair of tapered surfaces catching and supporting the electric wire and approaching to each other in accordance with nearing to a rotating axis. When a radius $R_{EW}$ of the electric wire 3 is 1.2 mm, an angle $\theta_T$ formed by the pair of tapered surfaces is designed at least 60 degrees and not more than $\theta_X$ degrees.

5 Claims, 9 Drawing Sheets

(56) References Cited

U.S. PATENT DOCUMENTS

| | | | | | |
|---|---|---|---|---|---|
| 2,929,136 | A * | 3/1960 | Andren | 29/417 |
| 3,635,153 | A * | 1/1972 | Gartside | 101/37 |
| 5,237,917 | A * | 8/1993 | Traut et al. | 101/35 |
| 5,282,311 | A * | 2/1994 | Tamura | 29/825 |
| 5,289,767 | A * | 3/1994 | Montalto et al. | 101/35 |
| 5,353,699 | A * | 10/1994 | Tamura | 101/35 |
| 5,444,466 | A * | 8/1995 | Smyczek et al. | 347/4 |
| 5,827,391 | A * | 10/1998 | Carriere et al. | 156/272.8 |
| 6,676,998 | B2 * | 1/2004 | Huang et al. | 427/434.6 |
| 6,823,780 | B2 * | 11/2004 | Vogt et al. | 101/35 |
| 7,875,309 | B2 * | 1/2011 | Kamata et al. | 427/117 |
| 8,017,177 | B2 * | 9/2011 | Kamata et al. | 427/117 |

FOREIGN PATENT DOCUMENTS

| | | |
|---|---|---|
| JP | 50-16229 A | 1/1993 |
| JP | 09-202528 A | 8/1997 |
| JP | 37-4851 | 10/2005 |

OTHER PUBLICATIONS

Office Action dated Jan. 20, 2012, issued in JP Patent Application No. 2005-355692.

Search Report dated Apr. 23, 2010, issued on the corresponding European patent Application No. 06 834 382.1.

Written Opinion of the International Searching Authority, issued on PCT/JP2006/324627.

* cited by examiner

WIRE COLORING APPARATUS INCLUDNG A ROLLER

CROSS REFERENCE TO RELATED APPLICATIONS

This is a continuation of U.S. patent application Ser. No. 12/086,278, filed Jun. 9, 2008, which application is a national stage application of International Application No. PCT/JP2006/324627, filed Dec. 5, 2006, which International application claims priority to Japanese Patent App. No. 2005-355692, filed Dec. 9, 2005. Each of the above-identified applications is incorporated herein by reference in its entirety.

BACKGROUND OF THE INVENTION

1. Field of the Invention

This invention relates to a roller, provided at a downstream side of a coloring unit for jetting a colorant out and onto a top of an outer surface of an electric wire moving along a lengthwise direction of the electric wire a coloring apparatus The roller has a pair of tapered surfaces touching the outer surface of the electric wire and converge toward one another as they near a rotating axis.

2. Description of the Related Art

Various electronic apparatuses are installed in an automobile. The electronic apparatuses are typically wired with a wiring harness for transmitting electric power from a power supply, or control signals from a computer. The wiring harness includes a plurality of electric wires and a connector jointed to ends of the electric wires. The electric wire has a conductive core wire and a cover made of insulative synthetic resin for covering the core wire. The electric wire is a so-called covered wire.

The electric wires are required to be distinguished with regard to a size of the core wire, a material of the cover (change of the material by existence of heat-resistance) and applications. The applications are, for example, for an airbag, an ABS (Antilock Brake System) or a system in the automobile, in which electric wires for transmitting control signals such as information of a car speed or a power transmission system are used.

The electric wires of the wiring harness include a mark on each outer surface to distinguish the applications (systems). A wire coloring apparatus 100 for applying a mark is shown in FIG. 7. The coloring apparatus 100 is an apparatus for putting a mark 400 at a part of an outer surface 300*a* of an electric wire 300, as shown in FIG. 7.

The wire coloring apparatus 100, as shown in FIG. 7, includes a coloring nozzle 104 located between the guide roll 102 and a forwarding roller 103, and a duct 105.

Reference numeral 101 in the figure corresponds to a frame. The frame 101 is installed, for example, on a floor of a factory. The frame 101 extends horizontally. The guide roll 102 is arranged rotatably at one end of the frame 101. The guide roll 102 winds a long electric wire 300 prior to marking. The guide roll 102 supplies the electric wire 300 toward the coloring nozzle 104 and the duct 105.

A pair of forwarding rollers 103 is arranged at the other end of the frame 101. The pair of forwarding rollers is supported rotatably by the frame 101, and aligned in a direction vertical to the floor. The pair of forwarding rollers 103 in FIG. 7 is aligned in a direction that is vertical to the floor, but can be aligned horizontally. The forwarding rollers 103 are rotated in opposite directions to each other at a same rotating speed by a motor (not shown). The pair of forwarding rollers 103 catches the electric wire 300 therebetween, and pulls the electric wire 300 from the guide roll 102 along a lengthwise direction of the electric wire 300. Thereby, the electric wire 300 moves from the guide roll 102 toward the forwarding roller 103 along an arrow K in FIG. 7.

The coloring nozzle 104 jets a colorant 500 toward the outer surface 300*a* of the electric wire 300. The duct 105 is arranged at a side of the forwarding roller 103 from the coloring nozzle 104 in the wire coloring apparatus 100 and between the coloring nozzle 104 and the forwarding roller 103. The duct 105 is for drying the colorant put on the outer surface 300*a* of the electric wire 300. The duct 105 is formed into a tube-shape for passing the electric wire 300 inside thereof. A drawing unit (not shown) like a vacuum pump is connected to the duct 105. The drawing unit draws a gas in the duct 105 to prevent filling a solvent and a dispersant in the colorant 500 outside the wire coloring apparatus 100. Patent Document 1 is the Japan Published Patent Application No. 2004-15722.

SUMMARY OF THE INVENTION

Objects to be Solved

According to the wire coloring apparatus 100 mentioned above, when the electric wire 300 is moved in a high speed, the electric wire 300 has a swaying motion. The swaying motion makes it difficult to place a mark at a designated position of the electric wire 300.

It is contemplated that a roller 106 is arranged between the guide roll 102 and the forwarding roller 103 as shown in FIG. 7. A V-shaped groove 106*a* is formed around a circumference of the roller 106 as shown in FIG. 8. The roller 106 is provided with a pair of tapered surfaces 106*b* approaching each other as they near a rotating axis C. The pair of tapered surfaces 106*b* of the roller 106 touches the outer surface of the electric wire 300. The roller 106 supports the electric wire 300 by touching on two points $P_1$, $P_2$ of the outer surface 300*a* of the electric wire 300. The two points $P_1$, $P_2$ are contact points of the roller 106 and the electric wire 300.

After coloring, the colorant 500 is not dried yet at a downstream side. As a result, the colorant 500 on the contact points $P_1$, $P_2$ is dragged, as shown in FIGS. 8 and 9, by the roller 106, which is arranged at the downstream side of the coloring nozzle 104 in the direction K of moving the electric wire 300 so that the electric wire is contaminated and the designated mark 400 cannot be formed.

It is contemplated to reduce a coloring angle $\theta_{AD}$ of the colorant 500 on the electric wire 300 for preventing the colorant 500 from being placed onto the contact points $P_1$, $P_2$. In order to reduce the coloring angle $\theta_{AD}$, an opening for jetting the colorant 500 of the coloring nozzle 104 must be small. However, the amount that the opening can be reduced is limited. In other words, the amount that the coloring angle $\theta_{AD}$ can be reduced is limited. Additionally, when reducing the coloring angle $\theta_{AD}$, performance of discrimination will be reduced. Thus, the problem is not yet solved.

Even if the coloring angle $\theta_{AD}$ is reduced to the utmost limit, the electric wire twists between the coloring nozzle 104 and the roller 106 and the colorant 500 touches the contact points $P_1$, $P_2$ and is dragged. An example of a cause of the twisting will be explained with reference to FIG. 10. In the prior art example shown in FIG. 7, prior to marking, the electric wire 300 is wound around the guide roll 102. A direction of a winding axis of the guide roll 102 is parallel to the moving direction K of the electric wire 300.

A structure, in which the electric wire 300 is led by another roll 107 instead of the guide roll 102 and guided in the moving direction K by the guide roll 102 as shown in FIG. 10, is contemplated. In this case, the direction of a winding axis of the roll 107 is not parallel to the moving direction K of the electric wire 300, but is perpendicular to the moving direction K. In such structure, the electric wire 300 is easily twisted between the coloring nozzle 104 and the roller 106.

One object of the present invention is to provide a roller, which prevents dragging a colorant, which is jetted on an electric wire and not dried.

How to Attain the Object of the Present Invention

In order to overcome the above problems, one aspect the present invention includes a roller provided at a downstream side of a coloring unit for jetting a colorant out to a top of an outer surface of an electric wire moving along a lengthwise direction of the electric wire in a moving direction of the electric wire, and the roller is provided with a pair of tapered surfaces touching the outer surface of the electric wire and approaching to each other in accordance with nearing to a rotating axis, and an angle formed by the pair of tapered surfaces has a value from at least 60 degrees to less than 180 degree for the electric wire with a 1.2 mm diameter.

According to an aspect of the present invention, the angle formed by the pair of tapered surfaces is from at least 60 degrees to less than 180 degrees for the electric wire with 1.2 mm diameter. The roller, in which the angle formed by the pair of tapered surfaces is from at least 60 degrees to less than 180 degrees, does not have contact points of the tapered surfaces of the roller and the electric wire within an area of coloring the colorant on the electric wire with 1.2 mm diameter.

An aspect of the present invention can also be characterized in that a roller is provided at a downstream side of a coloring unit for jetting a colorant out to a top of an outer surface of an electric wire moving along a lengthwise direction of the electric wire in a moving direction of the electric wire, and the roller is provided with a pair of tapered surfaces touching the outer surface of the electric wire and approaching to each other in accordance with nearing to a rotating axis, and an angle formed by the pair of tapered surfaces has a value from at least 30 degrees to less than 180 degree for the electric wire with a 2.8 mm diameter.

According to an aspect of the present invention, the angle formed by the pair of tapered surfaces is from at least 30 degrees to less than 180 degrees for the electric wire with 2.8 mm diameter. The roller, in which the angle formed by the pair of tapered surfaces is from at least 30 degrees to less than 180 degrees, does not have contact points of the tapered surfaces of the roller and the electric wire within an area of coloring the colorant on the electric wire with 2.8 mm diameter.

In accordance with an aspect of the invention, the angle formed by the pair of tapered surfaces is at least not more than 120 degree.

According to an aspect of the present invention, the angle formed by the pair of tapered surfaces is at least less than 120 degree. Thereby, the pair of tapered surfaces, which forms the angle at least not more than 120 degree, can securely support the electric wire movably.

EFFECT OF THE INVENTION

According to an aspect of the invention, for the electric wire with the diameter of 1.2 mm, the roller, in which the angle formed by the pair of tapered surfaces is from at least 60 degrees to less than 180 degrees, does not have contact points of the tapered surfaces of the roller and the electric wire within an area of coloring the colorant on the electric wire. Thereby, when the colorant jetted on the electric wire is not dried, dragging the colorant is prevented.

According to an aspect of the invention, for the electric wire with the diameter of 2.8 mm, the roller, in which the angle formed by the pair of tapered surfaces is from at least 30 degrees to less than 180 degrees, does not have contact points of the tapered surfaces of the roller and the electric wire within an area of coloring the colorant on the electric wire. Thereby, when the colorant jetted on the electric wire is not dried, dragging the colorant is prevented.

According to an aspect of the invention, the angle formed by the pair of tapered surfaces is at least not more than 120 degree, so that the electric wire can be securely supported movably.

DESCRIPTION OF THE PREFERRED EMBODIMENT

A roller according to a first embodiment will be described with reference to FIGS. 1-6. A wire coloring apparatus 1 (coloring apparatus hereafter), in which a roller of the present invention is assembled, is an apparatus for cutting an electric wire in a required length, and putting a mark 6 on a apart of an outer surface 3*a* of the electric wire 3. The coloring apparatus 1 colors, that is, applies a mark to the outer surface 3*a* of the electric wire 3.

Figure 6A:
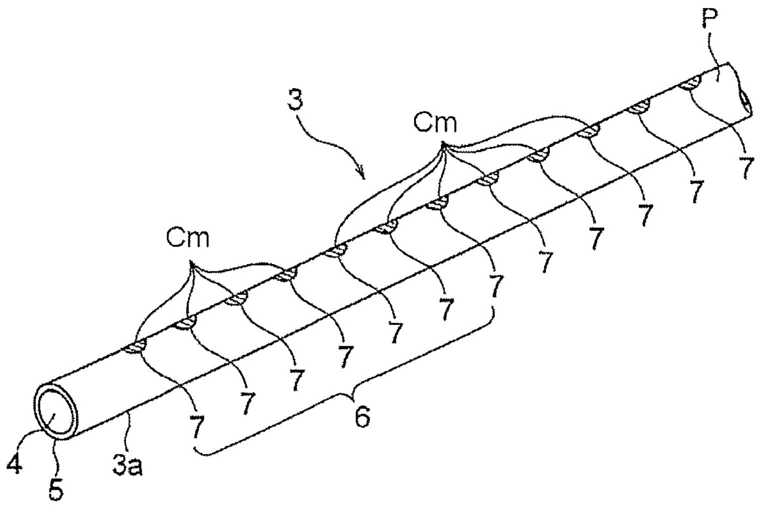
FIG. 6A is a perspective view of the electric wire colored by the wire coloring apparatus shown in FIG. 1.

The electric wire 3 forms a wiring harness wired in a automobile as a vehicle. The electric wire 3 includes a conductive core wire 4 and an insulation cover 5 as shown in FIG. 6A. The core wire 4 is formed by twisting a plurality of conductive wires. The conductive wire forming the core wire 4 is made of metal. The core wire can be structured with one conductive wire. The cover 5 is made of synthetic resin such as Polyvinylchloride (PVC). The cover 5 covers the core wire 4. The outer surface 3*a* of the electric wire 3 corresponds to an outer surface of the cover 5.

The cover 5 has a single color P. By mixing a predetermined colorant in the synthetic resin forming the cover 5, the outer surface 3*a* of the electric wire 3 can be colored the single color P. Without mixing a colorant in the synthetic resin, the native color of the synthetic resin can be defined as the single color P. When the single color P is the native color of the synthetic resin without mixing the colorant in the synthetic resin, the outer surface 3*a* of the electric wire 3 is called "uncolored". "Uncolored" herein means by mixing only single color colorant of white in the synthetic resin for the cover 5 or that the outer surface 3*a* of the electric wire 3 has the native color of the synthetic resin without mixing a colorant. When the synthetic resin is translucent without mixing colorant, the electric wire can be seen through. Therefore, mixing the single color colorant of white in the synthetic resin for the cover 5 is preferable.

Figure 6B:
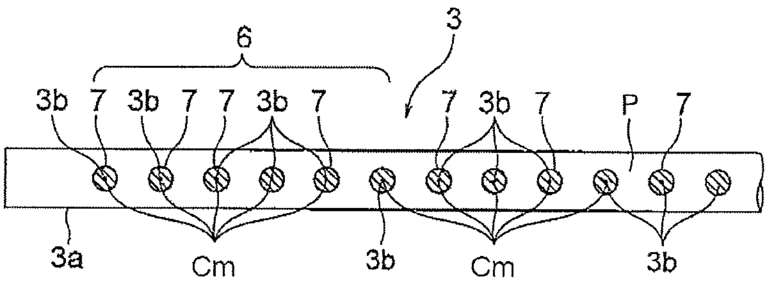
FIG. 6B is a plan view of the electric wire shown in FIG. 6A.
Figure 7:
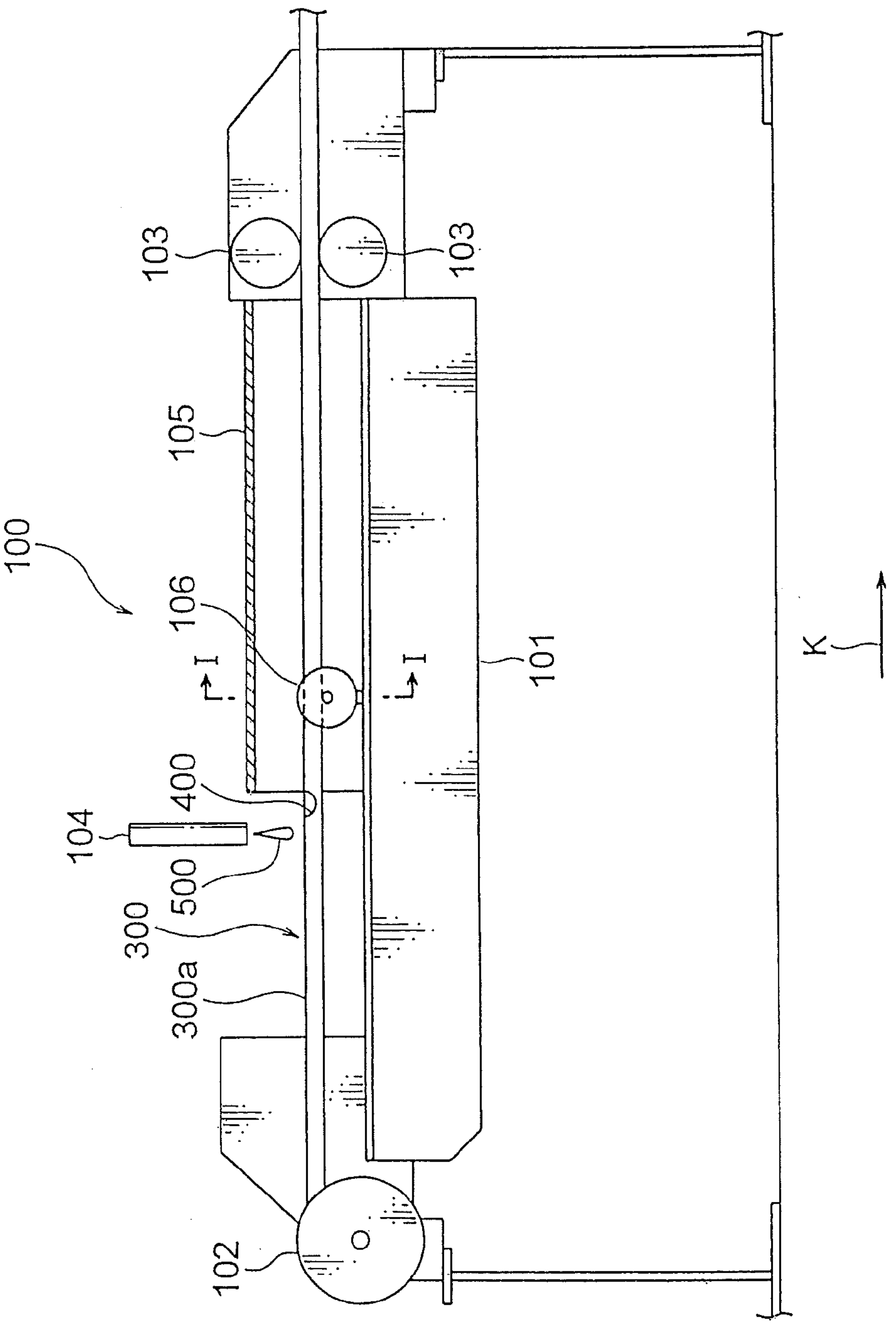
FIG. 7 is an illustration of an example of a wire coloring apparatus by prior art.

A mark 6 formed with a plurality of points 7 is put on the outer surface 3*a* of the electric wire 3. The point 7 has a color B (shown with hatching in FIG. 6A, 6B). The color B is different from the single color P. The point 7 has a round shape in plan view as shown in FIG. 6B. The plurality of points 7 is arranged according to a predetermined pattern along a lengthwise direction of the electric wire 3. In an example in the figure, the points 7 are arranged at even intervals along the lengthwise direction of the electric wire 3. The interval between the centers of adjacent points 7 is predetermined.

The electric wires 3 are bundled and connected at ends with connectors so as to form the wiring harness. The connectors are connected to each connector of various electronic devices in the automobile, and the wiring harness, that is the electric wires 3 transmit various signals and electric power to the various electronic devices.

By changing colors of respective points 7 of the mark 6 to various colors, each electric wire 3 can be distinguished. In the example in the figure, all points 7 have the same color B. According to a requirement, by changing the color B for each point 7, the colors B of the points 7 can be different from each other. The colors B of the points 7 of the mark 6 are used to distinguish a size, a color, a wire type and a system of each electric wire 3 of the wiring harness. The colors B of the points 7 of the mark 6 are used to distinguish applications of each electric wire 3 of the wiring harness.

The coloring apparatus 1 includes a winding roll 9 as a main body, a frame 10, a guide roll 11, a forwarding roller 12 as a transporting device, a straightening unit 13 as a pulling device, a slack-absorbing unit 14 as a slack absorber, a guiding unit 50, a coloring unit 15, a duct 16, a guide unit 60, an encoder 17 as a measuring device, a cutting unit 18 as a working device and a controller 19 as a control device.

The winding roll 9 winds the long electric wire 3 before applying the mark 6. The winding roll 9 is installed on a floor of a factory so as to arrange a direction of a winding axis vertically to the floor. In the example shown in FIG. 1, the winding roll 9 is installed so as to arrange the direction of the winding axis vertically to the floor, but can be installed so as to arrange the direction of the winding axis horizontally.

The frame 10 is mounted on the floor of the factory. The frame 10 extends horizontally. The guide roll 11 is mounted rotatably on an end portion of the frame 10. The guide roll 11 transports the electric wire 3 led from the winding roll 9 in sequence to the straightening unit 13, the slack-absorbing unit 14, the guiding unit 50, the coloring unit 15, the duct 16, the encoder 17 and the cutting unit 18.

A pair of forwarding rollers 12 is mounted at the other end of the frame 10. The pair of forwarding rollers 12 is supported rotatably by the frame 10 and arranged vertically to the floor. In the example shown in FIG. 1, the pair of forwarding rollers 12 is arranged vertically to the floor, but can be arranged horizontally to the floor. The forwarding rollers 12 are rotated in opposite directions to each other in the same rotating speed by a motor (not shown). The forwarding rollers 12 catch the electric wire 3 therebetween and pull the electric wire 3 from the guide roll 11 along a lengthwise direction of the electric wire 3.

The forwarding roller 12 performs as a pulling device for pulling and transporting the electric wire 3 along the lengthwise direction of the electric wire 3. The forwarding roller 12 transports the electric wire 3 along the lengthwise direction of the electric wire 3 and moves the later-described coloring nozzle 31 of the coloring unit 15 and the electric wire 3 relatively along the lengthwise direction of the electric wire 3. Thereby, the electric wire 3 moves from the guide roll 11 toward the forwarding roller 12 along an arrow K in FIG. 1. The arrow K shows a moving direction of the electric wire 3.

The straightening unit 13 is arranged at a side near to the forwarding roller 12 from the guide roll 11, and between the guide roll 11 and the forwarding roller 12. In other words, the straightening unit 13 is provided at a downstream side of the guide roll 11 and at an upstream side of the forwarding roller 12 in the moving direction K. The straightening unit 13 includes a plate-shaped unit main body 20, a plurality of first rollers 21 and a plurality of second rollers 22. The unit main body 20 is fixed on the frame 10.

Figure 1:
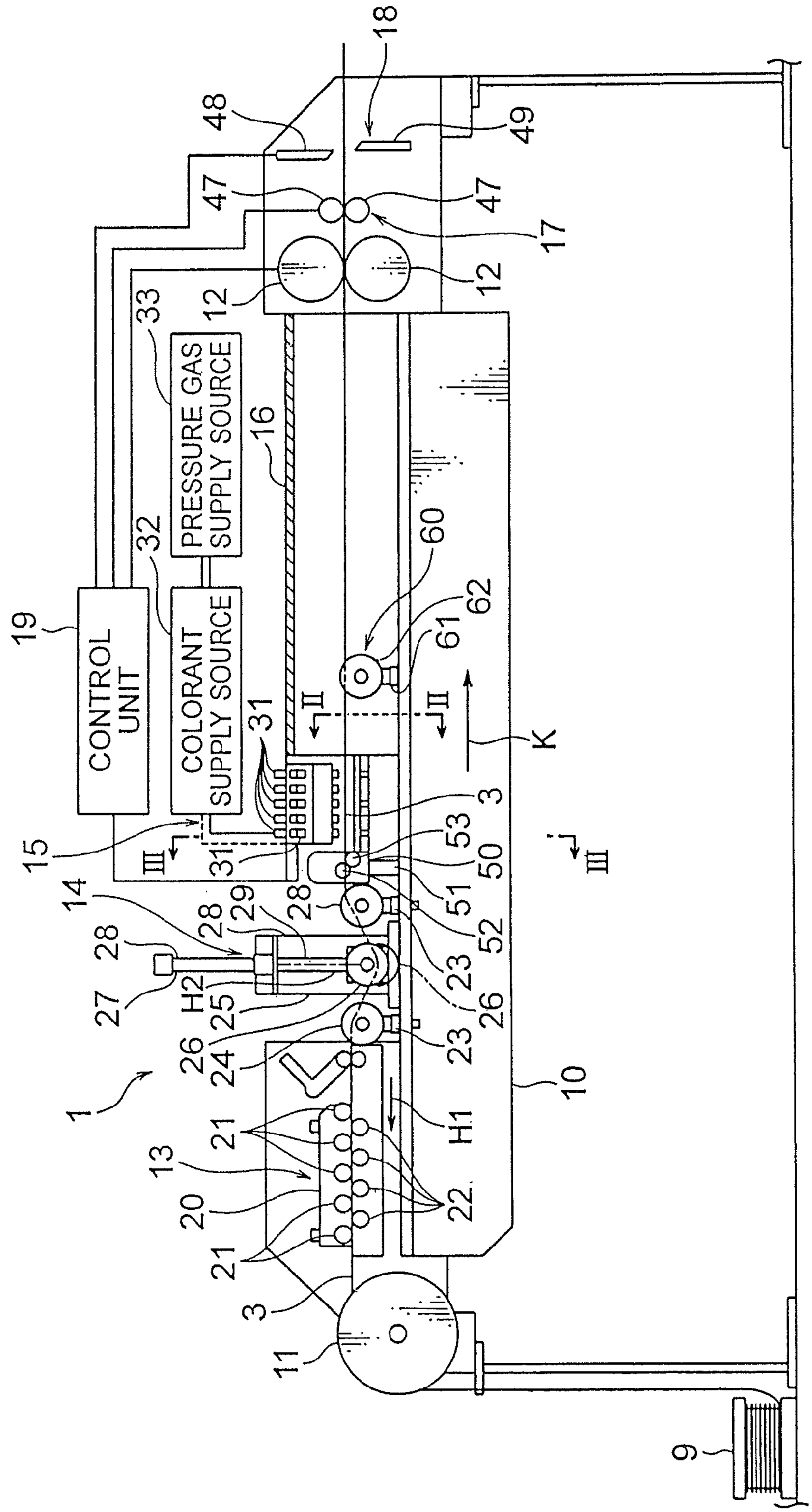
FIG. 1 is a side view showing a structure of a wire coloring apparatus including a roller of an embodiment according to the present invention.

The first and second rollers 21, 22 are respectively supported rotatably by the unit main body 20. The plurality of first rollers 21 is arranged over the electric wire 3 in a horizontal direction (the moving direction K). The plurality of second rollers 22 is arranged under the electric wire 3 in a horizontal direction (the moving direction K). The first rollers 21 and the second rollers 22 are provided in a staggered arrangement as shown in FIG. 1.

The straightening unit 13 catches the electric wire 3 forwarded from the guide roll 11 by the forwarding roller 12 between the first rollers 21 and the second rollers 22. The straightening unit 13 straightens the electric wire 3. Additionally, the straightening unit 13 loads a friction force on the electric wire 3 by catching the electric wire 3 between the first rollers 21 and the second rollers 22. In other words, the straightening unit 13 loads a friction force of a first bias force H1 with an opposite direction to a direction of pulling the electric wire 3 by the forwarding roller 12 (aforesaid moving direction K) on the electric wire 3. The first bias force H1 is smaller than a force of pulling the electric wire 3 by the forwarding roller 12. Thereby, the straightening unit 13 loads a tensile force along the lengthwise direction on the electric wire 3 for stretching the electric wire 3.

The slack-absorbing unit 14 is provided at the side, near to the forwarding roller 12, of the straightening unit 13, and between the straightening unit 13 and the forwarding roller 12. In other words, the slack-absorbing unit 14 is provided at a downstream side of the straightening unit 13 and at an upstream side of the forwarding roller 12 in the moving direction K. The slack-absorbing unit 14 is provided between the straightening unit 13 and the guiding unit 50.

The slack-absorbing unit 14 includes a pair of guide-roller support frames 23, a pair of guide rollers 24, a movable-roller support frame 25, a movable roller 26 and an air cylinder 27 as a biasing device. The guide-roller support frame 23 is fixed on the frame 10. The guide-roller support frame 23 extends upwardly from the frame 10. The pair of guide-roller support frames 23 is arranged along the moving direction K of the electric wire 3 with a space to each other.

The pair of guide rollers 24 is supported rotatably by the guide-roller support frames 23. The guide rollers 24 are arranged under the electric wire 3, and make outer surfaces thereof abut on the electric wire 3 so as to guide the electric wire 3 for preventing the electric wire 3 from moving out of the moving direction K. Therefore, the guide roller 24 guides the electric wire 3 in the moving direction K.

The movable-roller support frame 25 is fixed on the frame 10. The movable-roller support frame 25 extends upwardly from the frame 10. The movable-roller support frame 25 is provided between the pair of guide-roller support frames 23.

The movable roller 26 is supported rotatably and movably along a vertical direction by the movable-roller support frame 25. The movable roller 26 is arranged over the electric wire 3. The movable roller 26 is supported movably along the vertical direction, that is along a direction perpendicular to the moving direction K of the electric wire 3. The movable-roller support frame 25 is arranged in the center between the guide rollers 24.

The air cylinder 27 includes a cylinder main body 28 and an extendable rod 29 to extend from and retract in the cylinder main body 28. The cylinder main body 28 is fixed on the movable-roller support frame 25 and arranged over the electric wire 3. The extendable rod 29 extends downwardly from the cylinder main body 28. In other words, the extendable rod 29 extends from the cylinder main body 28 so as to approach the electric wire 3.

The movable roller 26 is mounted on the extendable rod 29. By supplying pressured gas into the cylinder main body 28, the air cylinder 27 biases the extendable rod 29, that is the movable roller 26, downwardly along a direction perpendicular (intersecting) to the moving direction K with a second bias force H2 (shown in FIG. 1). Therefore, the air cylinder 27 biases the movable roller 26 to approach the electric wire 3 with the second bias force H2. The second bias force H2 is smaller than the first bias force H1.

When the electric wire 3 is stopped temporarily to be cut by a later-described pair of cut blades 48, 49 approaching to each other in the cutting unit 18, the electric wire 3 moves along the arrow K by inertia and slackens between the pair of guide rollers 24. In the slack-absorbing unit 14 as structured above, the air cylinder 27 biases the movable roller 26 with the second bias force H2, so that the extendable rod 29 of the air cylinder 27 extends so as to move to a position shown with a long dashed double-short dashed line in FIG. 1. The slack-absorbing unit 14 biases the electric wire 3 slacked between the guide rollers 24 along the direction perpendicular to the moving direction K and maintains the electric wire 3 in tension by absorbing the slack.

The guiding unit 50 is arranged at a side near to the forwarding roller 12 of the slack-absorbing unit 14, between the slack-absorbing unit 14 and the forwarding roller 12. In other words, the guiding unit 50 is provided at a downstream side of the slack-absorbing unit 14 and at an upstream side of the forwarding roller 12 in the moving direction K. The guiding unit 50 is provided between the slack-absorbing unit 14 and the coloring nozzle 31. The guiding unit 50 is arranged at the just upstream side of the coloring unit 15 for controlling sway of the electric wire 3 at a jetting point of the coloring nozzle 31.

The guiding unit 50 includes a guiding-roller supporting frame 51 and a pair of guiding rollers 52, 53 as shown in FIG. 1. The guiding-roller supporting frame 51 is fixed on the frame 10. The guiding-roller supporting frame 51 extends upwardly from the frame 10. The guiding roller 52 is arranged over the electric wire 3, and an outer surface thereof abuts on the electric wire 3 so as to guide the electric wire 3 for preventing the electric wire 3 from moving out of the moving direction K. The guiding roller 53 is arranged under the electric wire 3, and an outer surface thereof abuts on the electric wire 3 so as to guide the electric wire 3 for preventing the electric wire 3 from moving out of the moving direction K. Therefore, the guiding rollers 52, 53 guide the electric wire 3 in the moving direction K.

The coloring unit 15 is arranged at a side near to the forwarding roller 12 of the guiding unit 50, and between the guiding unit 50 and the forwarding roller 12. In other words, the coloring unit 15 is provided at a downstream side of the guiding unit 50 and at an upstream side of the forwarding roller 12 in the moving direction K. The coloring unit 15, that is a later-described coloring nozzle 31 is provided between the forwarding roller 12 and the guiding unit 50.

Figure 4:
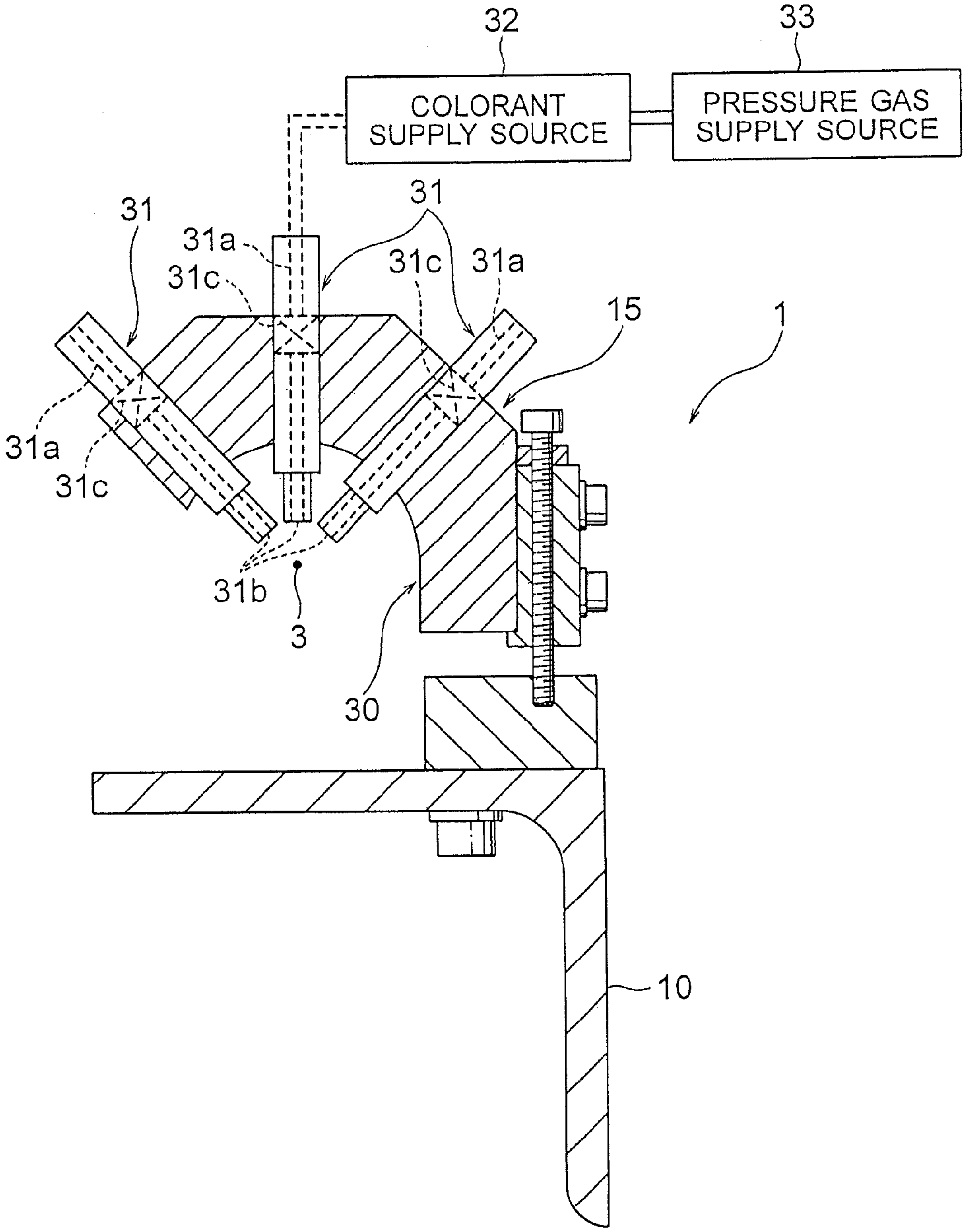
FIG. 4 is a cross-sectional view of a wire coloring unit taken along line in FIG. 1.

The coloring unit 15 includes a unit main body 30, a plurality of coloring nozzles 31, a plurality of colorant supply sources 32 (one of them is shown in FIG. 4, and the others are omitted) and a pressure-gas supply source 33, as shown in FIG. 4. The unit main body 30 is fixed on the frame 10. The unit main body 30 supports the plurality of coloring nozzles 31.

Figure 5:
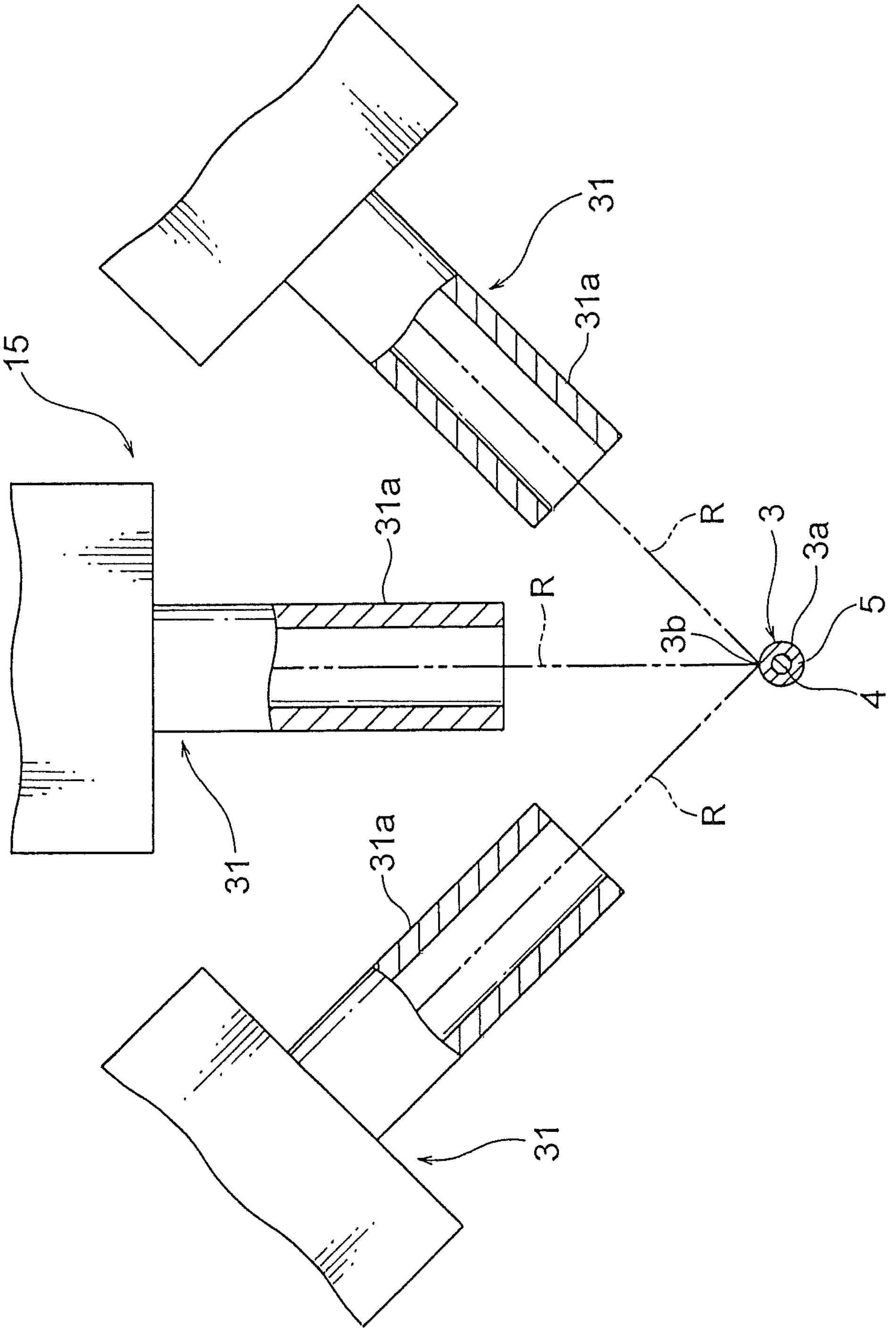
FIG. 5 is a partially expanded view of the coloring unit shown in FIG. 4.

The coloring nozzles 31 are opposed to the electric wire 3 moved along the arrow K by the pair of forwarding roller 12 as shown in FIG. 1. As shown in FIG. 5, the each coloring nozzle 31 has respectively inlet pipe 31*a*, which the colorant can flow through. The inlet pipe 31*a* extends linearly toward the outer surface 3*a* of the electric wire 3. An opening 31*b* of the inlet pipe 31*a* opposes to the electric wire 3 moved along the arrow K by the pair of forwarding roller 12.

The each coloring nozzle 31 has the opening 31*b* opposing to the electric wire 3. The opening 31*b* can let the colorant flow inside. The colorant is supplied from a colorant supply source 32 into the inlet pipe 31*a* of the coloring nozzle 31.

The coloring nozzle 31 is provided at the inlet pipe 31*a* with a valve 31*c*. The colorant supply source 32 is connected with a pressure-gas supply source 33. The pressure-gas supply source 33 supplies pressured gas into the each colorant supply source 32.

When the valve 31*c* is opened, the colorant in the inlet pipe 31*a* of the coloring nozzle 31 is jetted through the opening 31*b* toward the outer surface of the electric wire 3 by the pressured gas supplied from the pressure-gas supply source 33. Thus, the coloring nozzle 31 jets the colorant through the opening 31*b* opposite to the outer surface 3*a* of the electric wire 3. The coloring nozzle 31 jets the colorant in parallel to a lengthwise direction of the inlet pipe 31*a*.

When the valve 31*c* is closed, jetting the colorant in the coloring nozzle 31 is stopped. According to a structure mentioned above, the valve 31*c* is opened in a predetermined period by a signal from the controller 19, thereby the coloring nozzle 31 jets a predetermined amount of the colorant toward the outer surface 3*a* of the electric wire 3.

The plurality of coloring nozzles 31 is mounted on the unit main body 30 so as to be arranged along moving direction K of the electric wire 3 and in a circumferential direction of the electric wire 3. In an example of the figure, the unit main body 30 arranges five coloring nozzles along the moving direction K of the electric wire 3. The unit main body 30 arranges three coloring nozzles 31 in the circumferential direction of the electric wire 3.

As shown in FIG. 4, each coloring nozzle 31 is supported by the unit main body 30 so as to position a highest point 3*b* of the outer surface of the electric wire 3 on an axis R of the inlet pipe 31*a* (shown with a long dashed short dashed line in FIG. 5). The highest point 3*b* corresponds to the top of the outer surface of the electric wire in a vertical direction. The coloring nozzle 31 jets the colorant along the axis R. Thereby, the coloring nozzle 31 jets a predetermined amount of the colorant each time toward the highest point 3*b* of the electric wire 3. The colorant nozzle 31 corresponds to the coloring unit described in the specification.

The colorant corresponds to the colorant described in the present application, and is a liquid material, which is made by dissolving a color material (industrial organic substance) in water or other solvent. As the organic substance, there are dyestuff and pigment (most material is organic and synthetic). In case, the pigment is used as the dyestuff, or the dyestuff is used as the pigment. Physically, the colorant is coloring liquid or coating material.

The coloring liquid is a material by dissolving or dispersing dyestuff in solvent. The coating material is a material by dispersing the pigment in dispersant. Thereby, when the coloring liquid is put on the outer surface 3*a* of the electric wire 3, the dyestuff penetrates into the cover 5. When the coating material is put on the outer surface 3*a* of the electric wire 3, the pigment does not penetrate into the cover 5, but adheres on the outer surface 3*a*. Thus, the coloring unit 15 dyes a part of the outer surface 3*a* of the electric wire 3 with the dyestuff, or coats the outer surface 3*a* of the electric wire 3 with the pigment. Thus, coloring the outer surface 3*a* of the electric wire 3 means dyeing the part of the outer surface of the electric wire with the dyestuff (dyeing) and coating the part of the outer surface 3*a* of the electric wire with the pigment.

The solvent and the dispersant preferably have affinity with synthetic resin forming the cover 5. Thereby, the dyestuff can penetrate securely into the cover 5, or the pigment can securely adhere onto the outer surface 3*a*. Jetting means that the liquid colorant shaped in a liquid drop, that is a drop, is biased and jetted from the coloring nozzle 31 to the outer surface 3*a* of the electric wire 3. Thus, the coloring nozzle 31 of the coloring apparatus 1 according to the embodiment biases and jets the colorant shaped in the liquid drop, that is the drop, toward the outer surface 3*a* of the electric wire 3.

The duct 16 is arranged at a side near to the forwarding roller 12 of the coloring unit 15, and between the coloring unit 15 and the forwarding roller 12. In other words, the duct 16 is provided at a downstream side of the coloring unit 15 and at an upstream side of the forwarding roller 12 in the moving direction K. The duct 16 is formed into a pipe shape to pass the electric wire 3 inside thereof. The duct 16 is formed into a tube-shape for passing the electric wire 3 inside thereof. A drawing unit (not shown) like a vacuum pump is connected to the duct 16. The drawing unit draws a gas in the duct 16 to prevent filling the solvent and the dispersant in the colorant outside the coloring apparatus 1.

The encoder 17 is arranged at a downstream side of the forwarding roller 12 in the moving direction K of the electric wire 3. As shown in FIG. 1, the encoder 17 has a pair of rotating rollers 47. The rotating rollers 47 are supported rotatably around each axis thereof. Outer surfaces of the rotating rollers 47 touch the outer surface 3*a* of the electric wire 3 caught between the pair of forwarding rollers 12. When the core wire 4, that is the electric wire 3, runs (moves) along the arrow K, the rotating rollers 47 are rotated. In other words, in company with the core wire 4, that is the electric wire 3 running (moving) along the arrow K, the rotating rollers 47 rotates around the axes. An amount of running (moving) of the core wire 4, that is the electric wire 3, along the arrow K is in proportion to rotating number of the rotating rollers 47.

The encoder 17 is connected to the controller 19. When rotating rollers 47 rotate each predetermined angle, the encoder 17 outputs a pulse signal toward the controller 19. In other words, the encoder 17 outputs information according to the amount of moving of the electric wire 3 along the arrow K toward the controller 19. Thus, the encoder 17 measures data according to the amount of moving of the electric wire 3, and outputs the data according to the amount of moving of the electric wire 3 toward the controller 19. The encoder 17 outputs the pulse signal according to the amount of moving of the electric wire 3 generated by friction between the electric wire 3 and the rotating rollers 47. When a number of the pulse is not corresponded to the amount of moving in a condition of the outer surface 3*a* of the electric wire, by getting data of speed at the other point and feed-backing the data, an operation for comparing can be executed.

Figure 8:
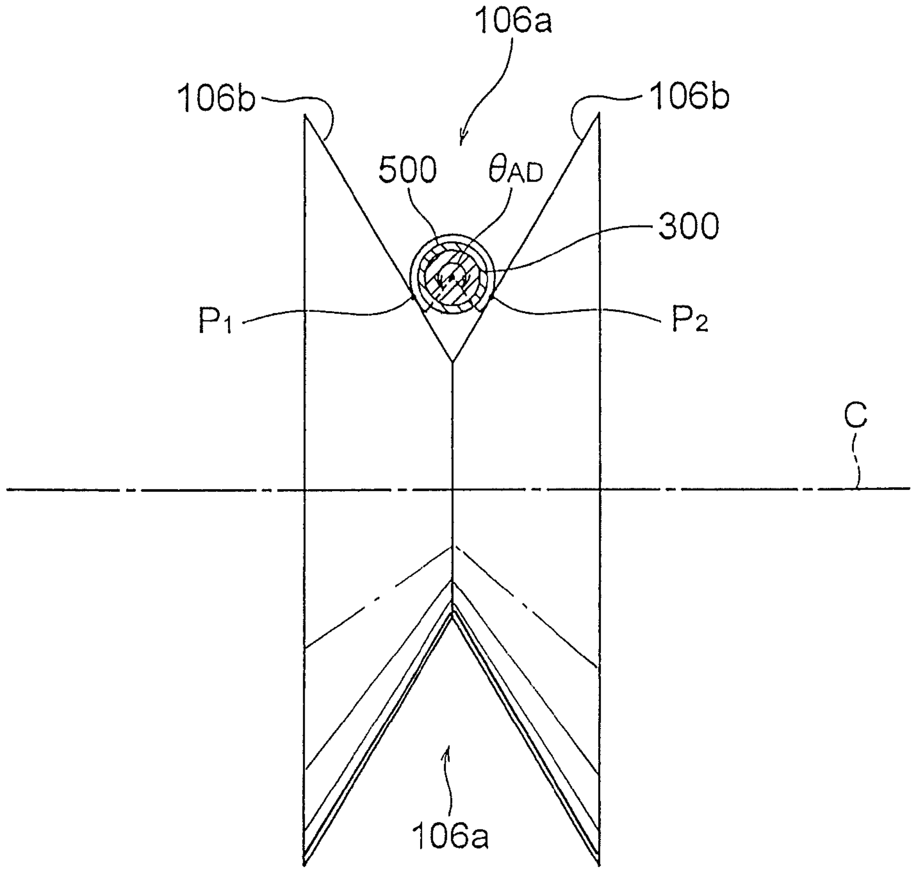
FIG. 8 is a cross-sectional view taken along line I-I of the wire coloring apparatus shown in FIG. 7.
Figure 9:
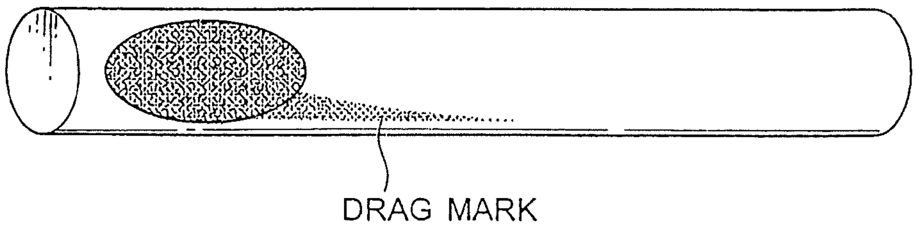
FIG. 9 is a perspective view of the electric wire for explaining problems by prior art.
Figure 10:
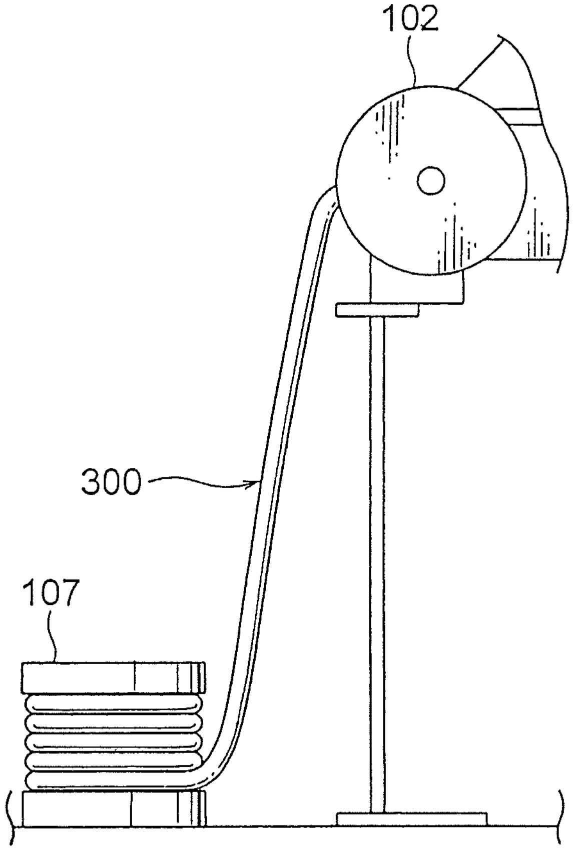
FIG. 10 is a partial view showing an example of the coloring apparatus by prior art.

The cutting unit 18 is arranged at a downstream side of the pair of rotating rollers 47 of the encoder 17 in the moving direction of the electric wire 3. The cutting unit 18 includes the pair of cut blades 48, 49. The pair of cut blades 48, 49 is aligned in a direction vertical to the floor. The pair of cut blades 48, 49 approaches and separates from each other in the vertical direction. The pair of cut blades 48, 49 approaches to each other, and catches the electric wire 3 forwarded by the pair of forwarding rollers 12 therebetween, and cuts it. When the pair of cut blades 48, 49 separated from each other, the pair of blades 48, 49 separates from the electric wire 3. In an example of FIG. 8, the pair of cut blades 48, 49 is arranged in the direction vertical to the floor, but can be arranged horizontally to the floor. In the case, the pair of cut blades 48, 49 approaches and separates from each other in a horizontal direction.

The controller 19 is a computer including a RAM, a ROM and a CPU. The controller 19 is connected to the forwarding roller 12, the encoder 17, the cut unit 18 and the coloring nozzle 31 so as to control motions of them and totally control the coloring apparatus 1. The forwarding roller 12 and the cut unit 19 can be controlled by the other controller. By receiving data of forwarding by the encoder 17 from the other controller, the controller 19 can connect and control the coloring nozzle 31.

The controller 19 stores a pattern of the mark 6 in advance. When a predetermined pulse signal, that is the datum according to the amount of moving of the electric wire 3 is inputted from the encoder 17, the controller 19 supplies an electric power to the predetermined valve 31*c* of the coloring nozzle 31 so as to jet a predetermined amount of the colorant from the coloring nozzle 31 toward the electric wire 3 on each time. According to the stored pattern of the mark 6, when the moving speed of the electric wire 3 increased, the controller 19 reduces a time period of jetting the colorant from the coloring nozzle 31, and when the moving speed of the electric wire 3 decreased, the controller 19 increase a time period of jetting the colorant from the coloring nozzle 31. Thus, the controller 19 colors the electric wire according to the stored pattern. The controller 19 makes the coloring nozzle 31 jet the predetermined amount of colorant in each time according to the amount of moving of the electric wire 3 measured by the encoder 17.

When it is judged that a predetermined amount of the electric wire 3 moved according to the data from the encoder 17, the controller 19 stops the forwarding roller 12 and makes the pair of cut blades 48, 49 approach to each other so as to cut the electric wire 3. As mentioned above, in the case that the cutting unit 18 is controlled by another controller, when the controller 19 receives data of the encoder 17 from the another controller and judges that a predetermined amount of the electric wire 3 moved according to the datum from the encoder 17, the controller 19 stops the forwarding roller 12 and transmits a datum of stopping the forwarding roller 12 to another controller. The another controller makes the pair of cut blades 48, 49 approach to each other so as to cut the electric wire 3 according to the datum of stopping from the controller 19.

According to the coloring apparatus structured above, to apply a colored mark to a wire, firstly, the guide roll 11 is mounted on the frame 10. The pair of cut blades 48, 49 are separated from each other, and the electric wire 3 wound around the guide roll 11 is passed, in sequence, through the straightening unit 13, the slack-absorbing unit 14, the coloring unit 15 and the duct 16, the electric wire 3 is caught between the pair of forwarding rollers 12. The coloring nozzle 31 is mounted on a predetermined position in the unit main body 30 of the coloring unit 15, and connected to the colorant supply source 32. Furthermore, the colorant supply source 32 is connected to the pressure-gas supply source 33, and gases in the duct 16 are drawn by the drawing unit.

Driving the forwarding roller 12 to rotate, pulling the electric wire 3 from the guide roll 11 for moving it along the lengthwise direction, and loading the first bias force H1 by the straightening unit 13 on the electric wire 3, the electric wire 3 is in the tensile condition. The second bias force H2 by the movable roller 26 is loaded on electric wire 3 by the air cylinder 27.

When the pulse signals in predetermined sequence from the encoder 17 are inputted to the controller 19, the controller 19 supplies electric power in a predetermined period and in predetermined intervals to a coil 40 of the predetermined coloring nozzle 31. Thereby, the coloring nozzle 31 jets the predetermined amount of the colorant to toward the outer surface 3*a* of the electric wire 3 in each time.

The solvent or dispersant in the colorant put on the outer surface 3*a* of the electric wire 3 is vaporized, and the outer surface 3*a* of the electric wire 3 is dyed with the dyestuff or painted with the pigment. The solvent or dispersant vaporized from the colorant put on the outer surface 3*a* of the electric wire 3 is drawn from the duct 16 by the drawing unit. Thus, the outer surface 3*a* of the electric wire 3 is colored.

When the controller 19 judges by the data from the encoder 17 that the electric wire of a predetermined length is forwarded, the controller 19 stops the forwarding roller 12. At the time, the electric wire 3 is slacked between the slack-absorbing unit 14 and the pair of guide rollers 24, and the movable roller 26 biased by the second bias force H2 moves to a position shown with a long dashed double-short dashed line in FIG. 1. Thereby, the extendable rod 29 of the air cylinder 27 in the slack-absorbing unit 14 extends. Then, the slack-absorbing unit 14 absorbs the slack of the electric wire 3.

The pair of cut blades 48, 49 approaches to each other to clamp the electric wire 3 therebetween and cuts it. Thus, the electric wire 3 with the mark 6 formed on the outer surface 3*a* is supplied.

The guide unit 60 supports the electric wire movably for preventing sway of the electric wire 3. The guide unit 60 is arranged at a side near to the forwarding roller 12 of the coloring nozzle 31, and between the coloring nozzle 31 and the forwarding roller 12. In other words, the guide unit 60 is provided at a downstream side of the coloring nozzle 31 and at an upstream side of the forwarding roller 12 in the moving direction K. The guide unit 60 is arranged in the duct 16 in the embodiment.

The guide unit 60 includes a guide-roller support frame 61 and a guide roller 62 as shown in FIG. 1. The guide-roller support frame 61 is fixed in the frame 10. The guide-roller support frame extends upwardly from the frame 10. The guide roller 62 is arranged under the electric wire as shown in FIGS. 2, 3 so as to touch on the outer surface 3*a* for preventing sway of the electric wire 3 and guiding the electric wire 3 in the moving direction K.

Figure 2:
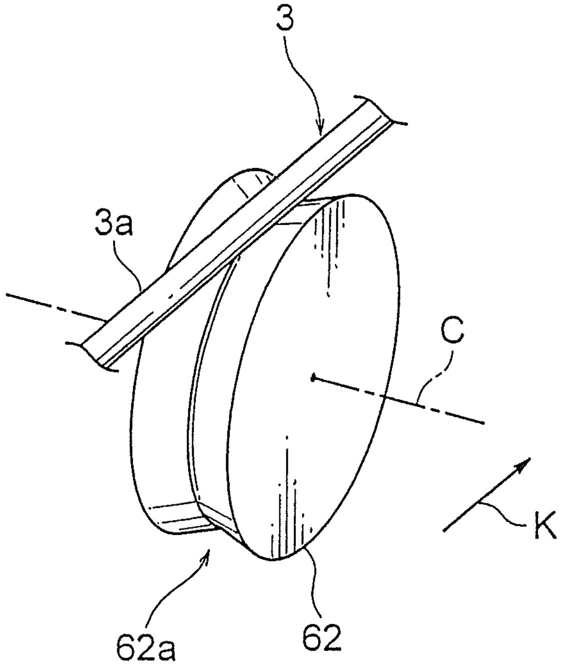
FIG. 2 is a perspective view of a guide roller structuring the wire coloring apparatus shown in FIG. 1.

The guide roller 62 is formed with a V-shaped groove 62*a* along a circumference of the guide roller 62 as shown in FIGS. 2, 3. In other words, the guide roller 62 is formed with a pair of tapered surfaces 62*b* approaching to each other in accordance with nearing to an rotating axis C. The guide roller 62 touches the outer surface 3*a* of the electric wire 3. In other words, the guide roller 62 touches two points $P_1$, $P_2$ of the outer surface 3*a* of the electric wire 3 to support the electric wire 3. The two points $P_1$, $P_2$ correspond to contact points of the guide roller 62 and the electric wire 3.

The colorant Cm is jetted toward the highest point 3*b* of the outer surface 3*a* of the electric wire 3 by the coloring nozzle 31. Thereby, as shown in FIG. 6B, the colorant Cm is put in a predetermined coloring area with the center of the highest point 3*b* of the outer surface 3*a*. An area of putting the colorant Cm is almost the same regardless a radius $R_{EW}$ of the electric wire 3. By comparing FIG. 3A and FIG. 3B, it is clear that a coloring angle $\theta_{AD}$ of the colorant Cm is changed according to the radius $R_{EW}$ of the electric wire 3.

Figure 3A:
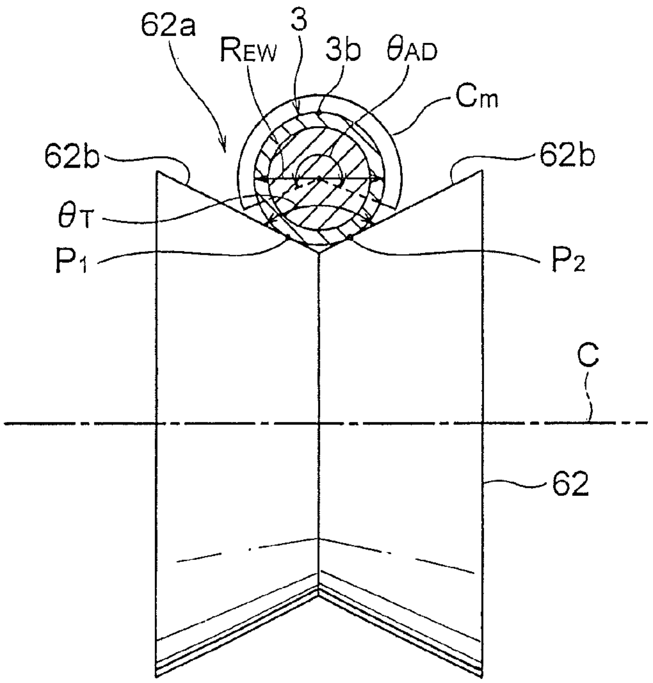
FIG. 3A and FIG. 3B are front views of the guide roller shown in FIG. 2.
Figure 3B:
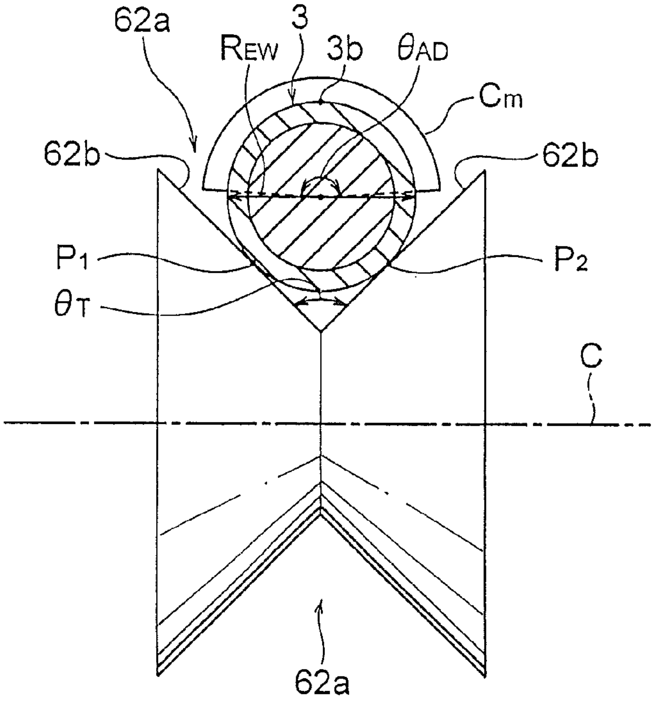

The coloring angle $\theta_{AD}$ is increased in accordance with reducing the radius $R_{EW}$ of the electric wire 3. Oppositely, the coloring angle $\theta_{AD}$ is decreased in accordance with increasing the radius $R_{EW}$ of the electric wire 3. Herein, coloring angle $\theta_{AD}$ is defined as an angle along a circumference about the center of axis of the electric wire 3 corresponding to the coloring area of the colorant Cm and is shown in FIGS. 3A, 3B. The radius $R_{EW}$ of the electric wire 3 shown in FIG. 3A is smaller than the radius $R_{EW}$ of the electric wire 3 shown in FIG. 3B. The coloring angle $\theta_{AD}$ of the electric wire 3 shown in FIG. 3A is larger than the coloring angle $\theta_{AD}$ of the electric wire 3 shown in FIG. 3B.

By comparing FIG. 3A and FIG. 3B, it is clear that the contact points $P_1$, $P_2$ near to the highest point 3*b*, that is near to the coloring area of the colorant Cm, according to an angle $\theta_T$ formed by the tapered surfaces 62*b* decreasing. Oppositely, the contact points $P_1$, $P_2$ apart from the highest point 3*b*, that is apart from the coloring area of the colorant Cm, according to the angle $\theta_T$ formed by the tapered surfaces 62*b* increasing.

According to the angle $\theta_T$ formed by the tapered surfaces 62*b* decreasing, performance of guiding the electric wire 3 by the guide roller 62 is improved. Oppositely, according to the angle $\theta_T$ formed by the tapered surfaces 62*b* increasing, performance of guiding the electric wire 3 by the guide roller 62 is dropped.

In the guide roller 62 by the present invention, the angle $\theta_T$ formed by the tapered surfaces 62*b* is designed at least 60 degrees and not more than 120 degrees for the electric wire 3 of the radius $R_{EW}$ of 1.2 mm. In other words, when the radius $R_{EW}$ of the electric wire 3 is 1.2 mm, the angle $\theta_T$ formed by the tapered surfaces 62*b* is designed within a range of at least 60 degrees and less than 180 degrees. Thereby, the contact points $P_1$, $P_2$ of the tapered surfaces 62*b* of the guide roller 62 and the electric wire 3 are not located in the coloring area of the colorant Cm of the electric wire 3, so that the drag of the colorant is prevented even if the colorant jetted on the electric wire 3 is not dried.

In the guide roller 62 by the present invention, the angle $\theta_T$ formed by the tapered surfaces 62*b* is designed at least 30 degrees and not more than 120 degrees for the electric wire 3 of the radius $R_{EW}$ of 2.8 mm. In other words, when the radius $R_{EW}$ of the electric wire 3 is 2.8 mm, the angle $\theta_T$ formed by the tapered surfaces 62*b* is designed within a range of at least 30 degrees and less than 180 degrees. Thereby, the contact points $P_1$, $P_2$ of the tapered surfaces 62*b* of the guide roller 62 and the electric wire 3 are not located in the coloring area of the colorant Cm of the electric wire 3, so that the drag of the colorant is prevented even if the colorant jetted on the electric wire 3 is not dried.

As mentioned above, the angle $\theta_T$ formed by the tapered surfaces 62*b* is designed at least not more than 120 degrees. Thereby, the electric wire 3 can be securely supported movably.

Inventors of the present invention examined existence of drags of the colorant Cm put on the outer surface 3*a* of the electric wire 3 of the 1.2 mm diameter by the guide roller 62 and performance of guiding by the guide roller 62 when changing the angle $\theta_T$ formed by the tapered surfaces 62*b* of the guide roller 62 according to the present invention 30, 40, 50, 60, 90, 120, 140, 160 and 180 degrees. The results are shown in Table 1.

TABLE 1

| for electric wire of 1.2 mm diameter | | | |
|---|---|---|---|
| | Angle $\theta_T$ | Drag | Guiding |
| Comparison | 30 deg. | bad | good |
| Comparison | 40 deg. | bad | good |
| Comparison | 50 deg. | bit bad | good |
| Invention | 60 deg. | good | good |
| Invention | 90 deg. | good | good |
| Invention | 120 deg. | good | good |
| Comparison | 140 deg. | good | bit bad |
| Comparison | 160 deg. | good | bad |
| Comparison | 180 deg. | good | bad |

As shown in Table 1, when the angle $\theta_T$ is 30, 40 degrees, drags of the colorant by the guide roller 62 are recognized. When the angle $\theta_T$ is 50 degrees, drags of the colorant by the guide roller 62 is also recognized, but an extent of the drag is smaller than that when the angle $\theta_T$ is 30, 40 degrees. On the other hand, when the angle $\theta_T$ is 60, 90, 120, 140, 160 and 180 degrees, drags of the colorant by the guide roller 62 are not recognized and the electric wire 3 with 1.2 mm diameter is not contaminated. Additionally, when the angle $\theta_T$ is 30, 40, 50, 60, 90 and 120 degrees, it is recognized that the electric wire 3 is not swayed and not dropped from the guide roller 62. When the angle $\theta_T$ is 140 degrees, it is recognized that the electric wire 3 is swayed largely. Also, when the angle $\theta_T$ is 160 and 180 degrees, it is recognized that the electric wire 3 drops from the guide roller 62.

The inventors of the present invention examined existence of drags of the colorant Cm put on the outer surface 3*a* of the electric wire 3 of the 2.8 mm diameter by the guide roller 62 and performance of guiding by the guide roller 62 when changing the angle $\theta_T$ formed by the tapered surfaces 62*b* of the guide roller 62 according to the present invention 10, 20, 25, 30, 90, 120, 140, 160 and 180 degrees. The results are shown in Table 2.

TABLE 2

| for electric wire of 2.8 mm diameter | | | |
|---|---|---|---|
| | Angle $\theta_T$ | Drag | Guiding |
| Comparison | 10 deg. | bad | good |
| Comparison | 20 deg. | bad | good |
| Comparison | 25 deg. | bit bad | good |
| Invention | 30 deg. | good | good |
| Invention | 90 deg. | good | good |
| Invention | 120 deg. | good | good |
| Comparison | 140 deg. | good | bit bad |
| Comparison | 160 deg. | good | bad |
| Comparison | 180 deg. | good | bad |

As shown in Table 2, when the angle $\theta_T$ is 10, 20 degrees, drags of the colorant by the guide roller 62 are recognized. When the angle $\theta_T$ is 25 degrees, drags of the colorant by the guide roller 62 is also recognized, but an extent of the drag is smaller than that when the angle $\theta_T$ is 10, 20 degrees. On the other hand, when the angle $\theta_T$ is 30, 90, 120, 140, 160 and 180 degrees, drags of the colorant by the guide roller 62 are not recognized and the electric wire 3 with 2.8 mm diameter is not contaminated. Additionally, when the angle $\theta_T$ is 10, 20, 25, 30, 90 and 120 degrees, it is recognized that the electric wire 3 is not swayed and not dropped from the guide roller 62. When the angle $\theta_T$ is 140 degrees, it is recognized that the electric wire 3 is swayed largely. Also, when the angle $\theta_T$ is 160 and 180 degrees, it is recognized that the electric wire 3 drops from the guide roller 62.

As mentioned above, according to the angle $\theta_T$ formed by the tapered surfaces 62*b* decreasing, performance of guiding the electric wire 3 by the guide roller 62 is improved. Therefore, it is most suitable to select the smallest value within the range of the angle $\theta_T$ corresponding to the radius $R_{EW}$ of the electric wire 3. When a diameter of the electric wire 3 is 1.2 mm, it is most suitable to design the angle $\theta_T$ formed by the tapered surfaces 62*b* to be 30 degrees. When a diameter of the electric wire 3 is 2.8 mm, it is most suitable to design the angle $\theta_T$ formed by the tapered surfaces 62*b* to be 30 degrees. By designing most suitably, according to the radius $R_{EW}$ of the electric wire 3 being smaller, the angle $\theta_T$ formed by the pair of tapered surfaces 62*b* of the guide roller 62 is increased.

According to the above embodiment, the guide roller 62 is arranged in the duct 16. The present invention is not limited to that structure. The guide roller 62 can be arranged at the downstream side of the coloring nozzle 31 in the moving direction K of the electric wire 3. To be more suitable, the guide roller 62 may be arranged between the downstream side of the coloring nozzle 31 and a point where the colorant Cm put on the electric wire 3 is dried out completely. For example, the guide roller 62 may be arranged between the coloring nozzle 31 and the duct 16.

Also, according to the above embodiment, the angle $\theta_T$ formed by the pair of tapered surfaces 62*b* is designed not more than angle $\theta_X$ degrees. The present invention is not limited to that. In the other words, when the diameter of the electric wire 3 is 1.2 mm, assuming no problem about the electric wire 3 dropping from the guide roller 62, the angle $\theta_T$ formed by the pair of tapered surfaces 62*b* can be designed at least 60 degrees and less than 180 degrees. When the diameter of the electric wire 3 is 2.8 mm, the angle $\theta_T$ formed by the pair of tapered surfaces 62*b* can be designed at least 30 degrees and less than 180 degrees.

The embodiment mentioned above is a just typical example of the present invention. The present invention is not limited by the embodiment. Modification may be made without departing from the scope of the present invention.

What is claimed is:

1. A wire coloring apparatus for coloring a wire, comprising:

a guide roller disposed at a first end of the wire coloring apparatus;

a pair of forwarding rollers disposed at a second end of the wire coloring apparatus opposite the first end;

a straightening unit;

a coloring unit comprising three coloring nozzles, wherein a circle concentric with the wire can be defined in a space surrounding the wire and the three coloring nozzles are located on an arc, of the concentric circle, which is above the wire in the vertical direction, whereby an axis of each of the nozzles is aligned with a highest point of an outer surface of the wire in a vertical direction and the nozzles apply a colorant on the highest point of the outer surface of the wire; and a guide unit consisting of a grooved roller for receiving an outer surface of the wire moving along the wire coloring apparatus from the first end to the second end and along the grooved roller in a direction corresponding to a longitudinal axis of the wire, the grooved roller being disposed at a downstream side of the coloring unit and between the coloring unit and the pair of forwarding rollers, wherein the grooved roller comprises:

a pair of tapered surfaces converging toward one another as they approach an axis of rotation of the roller, the pair of tapered surfaces forming a groove which contacts the wire at contacting points, wherein an angle formed by the pair of tapered surfaces as a function of the diameter of the wire and an area of coloring is between 60 degrees and 180 degrees for a wire with a 1.2 mm diameter and between 30 degrees and 180 degree for a wire with a 2.8 mm diameter; and, wherein the coloring unit applies a colorant on the outer surface of the wire beyond the contacting points of the grooved roller and the wire, whereby the colorant is not dragged by the tapered surfaces of the grooved roller when the colorant on the wire is not dried.

2. The wire coloring apparatus according to claim 1, wherein the angle formed by the pair of tapered surfaces has a value of at least not more than 120 degrees.

3. The wire coloring apparatus according to claim 1, wherein the colorant is disposed on the outer surface of the wire above the contacting points of the grooved roller and the wire.

4. A wire coloring apparatus for coloring a wire comprising:

a guide roller disposed at a first end of the wire coloring apparatus;

a pair of forwarding rollers disposed at a second end of the wire coloring apparatus-opposite the first end;

a straightening unit;

a coloring unit comprising three coloring nozzles, wherein a circle concentric with the wire can be defined in a space surrounding the wire and the three coloring nozzles are located on an arc, of the concentric circle, which is above the wire in the vertical direction, whereby an axis of each of the nozzles is aligned with a highest point of an outer surface of the wire in a vertical direction and the nozzles apply a colorant on the highest point of the outer surface of the wire; and a guide unit consisting of a grooved roller for receiving an outer surface of the wire moving along the wire coloring apparatus from the first end to the second end and along the grooved roller in a direction corresponding to a longitudinal axis of the wire, the grooved roller being disposed at a downstream side of the coloring unit and between the coloring unit and the pair of forwarding rollers, wherein the grooved roller comprises:

a pair of tapered surfaces converging toward one another as they approach an axis of rotation of the grooved roller, the pair of tapered surfaces forming a groove which contacts the wire at contacting points, wherein an angle formed by the pair of tapered surfaces as a function of the diameter of the wire and an area of coloring is from at least 60 degrees to less than 180 degrees for an electric wire with a 1.2 mm diameter; and wherein the grooved roller is disposed at a downstream side of the coloring unit and the coloring unit is configured to apply a colorant on the outer surface of the wire beyond the contacting points of the grooved roller and the wire, whereby the colorant is not dragged by the tapered surfaces of the grooved roller when the colorant on the wire is not dried.

5. The wire coloring apparatus according to claim 4, wherein the colorant is disposed on the outer surface of the wire above the contacting points of the grooved roller and the wire.

* * * * *